April 10, 1928.
J. M. BARR
1,665,522
ROLLING MACHINE
Filed Dec. 8, 1923
4 Sheets-Sheet 1
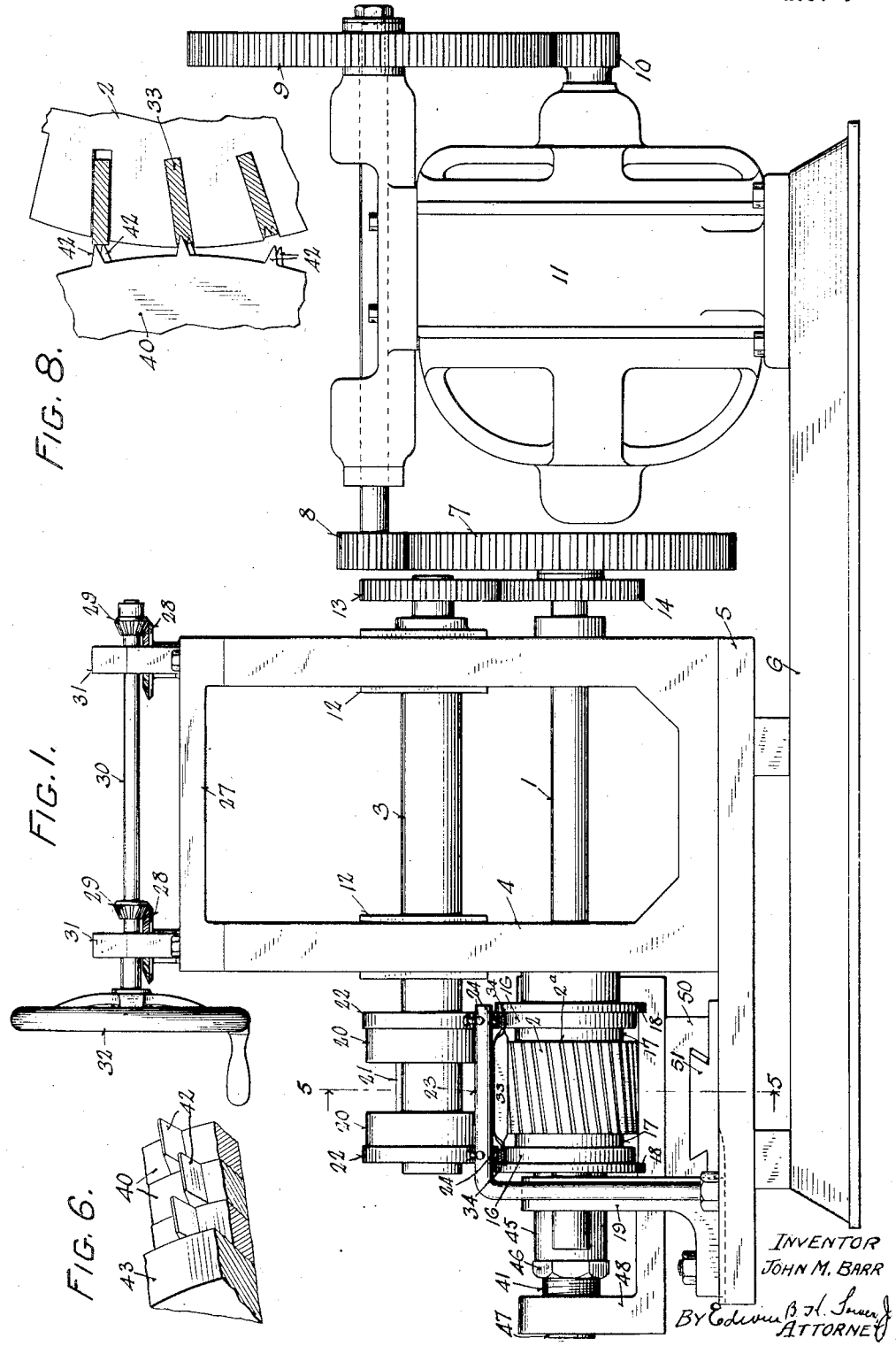
INVENTOR
JOHN M. BARR
BY Edwin B H Sower
ATTORNEY April 10, 1928. 1,665,522
J. M. BARR
ROLLING MACHINE
Filed Dec. 8, 1923 4 Sheets-Sheet 2
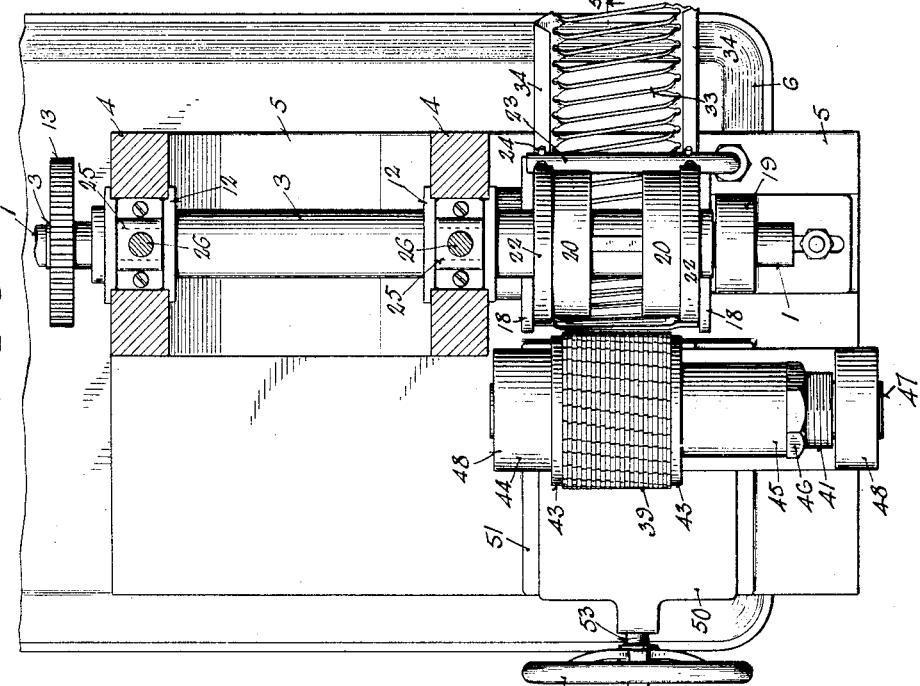
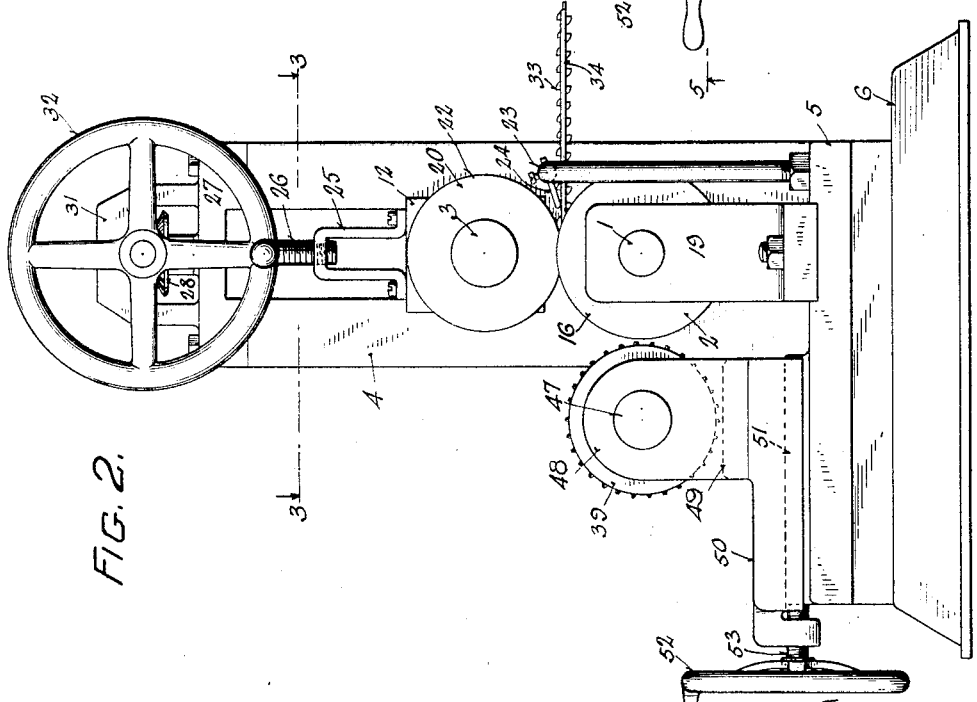
INVENTOR:
JOHN M. BARR
BY Edwin B. H. Tower, Jr.
ATTORNEY.

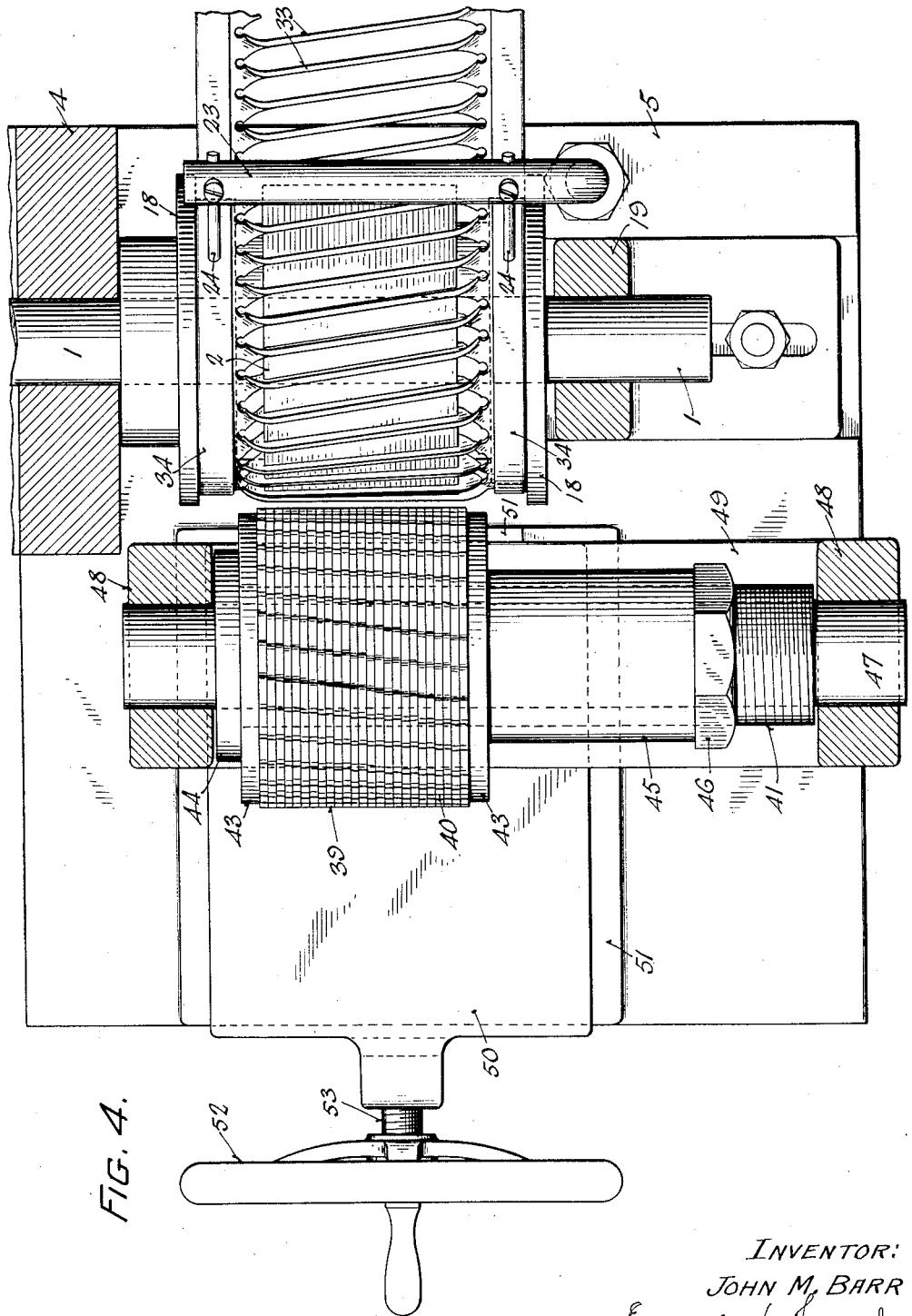

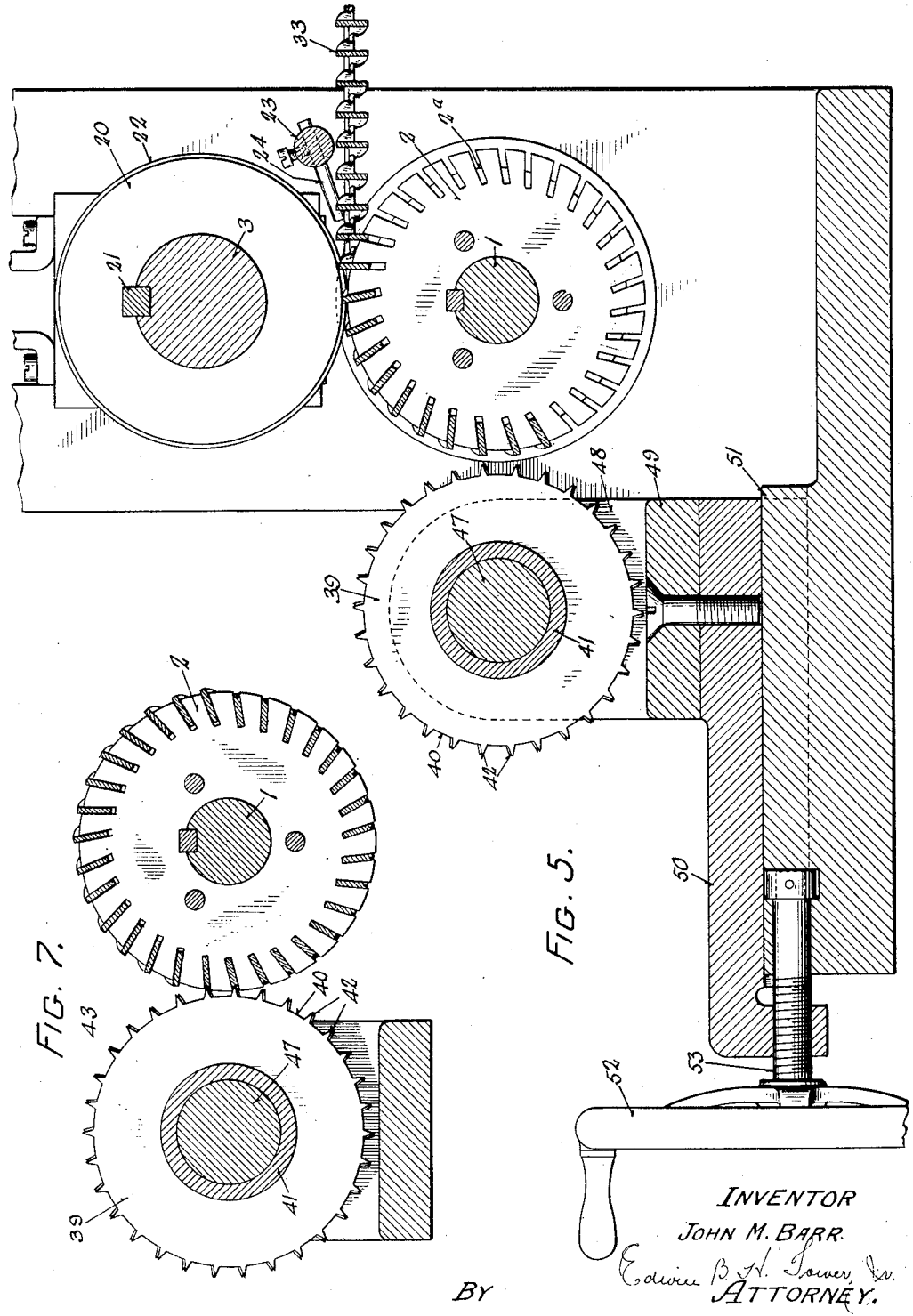

Patented Apr. 10, 1928.

1,665,522

UNITED STATES PATENT OFFICE.

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN.

ROLLING MACHINE.

Application filed December 8, 1923. Serial No. 679,505.

This invention relates to a rolling machine.

It relates more particularly to a machine for applying to a peripherally slotted rotor, a winding having spaced conductors joined to end rings, although it may be used for other purposes.

The winding ordinarily is made from sheet metal formed from a single piece or several sections joined together.

The rotor core has longitudinal peripheral slots which are either axially or spirally disposed.

A rotor core with its winding applied thereto by the machine to be described herein is disclosed and claimed in Patent No. 1,597,666 granted August 31, 1926.

Efficiency and long service of an induction motor having a rotor of the above type require the conductors to be accurately positioned in the rotor slots and firmly seated upon the bottom thereof.

An object of the invention is to provide an efficient machine for rapidly applying the winding to a rotor core.

Another object is to provide a machine for firmly seating the conductors of a winding upon the bottom of the rotor slots and locking the same in such position.

Another object is to provide a machine which, during the application of a winding to a rotor core, will increase the tensile strength of the winding.

According to the invention, the machine comprises mechanism to roll the winding onto the rotor core and to insert the conductors into the slots.

The invention also provides means to drive the conductors to the bottom of the slots to seat the same thereupon and expand the conductors laterally so as to impinge the same upon the side walls of the slots.

The views of the drawings are:

Fig. 1 is a front elevation of the machine for applying the winding to the rotor core.

Fig. 2 is a left end elevation of the machine.

Fig. 3 is a top plan partially in section of a portion of the machine taken from line 3—3 of Fig. 2.

Fig. 4 is an enlarged top plan of the machine with portions thereof removed so as to show the winding with part of its conductors inserted in the rotor slots.

Fig. 5 is an enlarged vertical section on line 5—5 of Fig. 3.

Fig. 6 is an enlarged perspective of several of the projecting teeth in one row on the driving tool.

Fig. 7 is a vertical section through the driving tool showing the same in operative relation to a rotor core.

Fig. 8 is an enlarged end elevation of several rows of the projecting teeth in operative relation to conductors of the rotor winding.

The machine comprises a rotatable shaft 1 for carrying a rotor core 2 to which the winding is to be applied and a rotable shaft 3 for carrying the mechanism which engages the winding to insert the conductors thereof into the slots of the rotor core.

The rotor core 2 is keyed to the shaft 1 so as to rotate therewith.

The rotor core 2 illustrated herein has spirally disposed longitudinal slots $2^a$ formed in the periphery thereof.

The shaft 1 is journalled in the legs of a U-shaped frame 4 mounted upon a base 5 which is supported by a bed plate 6.

The shaft 1 is driven through suitable gears 7, 8, 9 and 10 by an electric motor 11 mounted upon the bed plate 6.

The shaft 3 is journalled in blocks 12, mounted to slide vertically in the bifurcated legs of the frame 4, as clearly shown in Figs. 2 and 3.

The shaft 3 is driven from the shaft 1 by spur gears 13 and 14.

The shaft 1 carries two cylindrical mandrels 16 located at the ends of the rotor core 2.

Each mandrel 16 has an annular shoulder 17 to abut the end of the rotor core 2 and a circumferential flange 18 to abut the outer edge of an end ring 34 of the winding to be applied to the core so as to properly position the winding transversely with respect to the core. The part of the mandrel between the shoulder 17 and the flange 18, serves as a forming or bending die to form the end ring, as will be clearly explained hereinafter.

The free end of shaft 1 is supported by an adjustable bracket 19, removably mounted upon the base 5. This bracket is removably mounted so as to permit the positioning of the rotor and mandrels upon the shaft and their removal therefrom.

The shaft 3 carries two spaced pressure rollers 20 keyed thereto by a spline 21.

The pressure rollers 20 may, of course, be formed of one piece of material but in practice are usually made separately so as to permit of the adjustment thereof along shaft 3 to accommodate rotor cores of different lengths.

Each roller has a flange 22 to engage an end ring of the winding as it is being applied.

The rollers 20 engage the conductors of the winding to insert the same into the rotor slots $2^a$.

A horizontal bar 23 supported by the base 5 assists flanges 18 of the mandrels 16 in guiding the winding as it is being applied. The horizontal bar 23 carries two adjustable guides 24 which engage the end rings and assist in bending the end rings into circular form.

The horizontal bar 23 and its guides 24, in practice, may be so positioned that the horizontal portions of the end rings are maintained at substantially 90° to the slot which a conductor of the winding is about to enter.

In order for the conductors to properly enter the slots when the winding is being applied, the slots should be slightly wider than the thickness of the conductors to afford a small clearance. The pitch of the conductors should be less than the peripheral pitch of the slots and greater than the pitch of the slots at the bottom thereof.

In order that the pressure rollers 20 may be properly positioned with respect to the rotor core and the winding to be applied thereto, the shaft 3 carrying these rollers is adjustable vertically. For this purpose, each of the journal blocks 12 for the shaft 3 has fastened thereto a bracket 25 carried by a vertically disposed threaded shaft 26. These shafts are journalled in a cross bar 27 mounted on the upper ends of the legs of frame 4. Each of the vertically disposed shafts 26 has fastened thereto a beveled gear 28 which meshes with a beveled gear 29 mounted on a shaft 30 journalled in a bracket 31 mounted on cross bar 27.

By means of a hand wheel 32 on shaft 30, the vertically disposed threaded shafts 26 may be rotated simultaneously to raise and lower the journalled blocks 12 and the shaft 3 with the apparatus mounted thereon.

Since the shaft 3 is vertically adjustable, the optimum pressure may be exerted upon the end rings and conductors of the winding as it is being applied to the rotor core. Furthermore, this adjustment enables the rotor to be more quickly positioned on the shaft to receive the winding and to be removed therefrom with the winding applied.

After the rotor core 2 has been positioned upon shaft 1, with the mandrels 16 abutting the ends of the core, and the shaft 3 and the pressure rollers 20 lowered to proper position, the application of the winding to the rotor core is started. After the first conductor 33 of the winding is inserted by hand into a slot $2^a$ of the rotor core 2, the motor 11 is started so as to rotate the shafts 1 and 3. The remainder of the conductors are then inserted by the machine. The winding as it is being applied is guided by flanges 18 of the mandrels which engage the free edges of the end rings 34, by the guides 24 which engage the outer surface of the end rings, and by the horizontal bar 23 which engages the outer edges of the conductors 33.

The pressure rollers 20, having been previously adjusted both longitudinally and vertically, engage the conductors 33, and their flanges 22 engage the end rings 34 so as to force the conductors into the rotor slots. The pressure rollers 20 are positioned properly horizontally when their outer faces at the periphery thereof engage the inner faces of the mandrel flanges 18.

The pressure rollers 20 force the conductors into the slots to approximately half the depth thereof and the flanges 22, while in engagement with the end rings, cause the end rings to rest upon the forming dies of mandrels 16.

While the winding, which is made of stiff material such as sheet copper, is being applied to the rotor core, the flanges of the pressure rollers 20 assist the guides 24 by holding the end rings in close engagement with the forming dies while the end rings are being bent into circular form.

After the conductors of the winding have been inserted in the slots of the rotor core, the conductors are driven to the bottom of the slots and seated thereupon, and the outer edges of the conductors are expanded to make the same impinge against the side walls of the slots and thus fasten the conductors therein.

The portion of the machine by which the conductors are driven to the bottom of the slots, seated thereupon and fastened therein, will now be described.

This apparatus or driving tool 39 comprises a plurality of annular discs 40 mounted upon a sleeve 41.

Each disc 40 has a plurality of peripheral projections or teeth 42 so spaced that they will register with the conductors when inserted in the slots of the core. When assembled side by side the discs form a roll.

The teeth or projections 42 of adjacent discs of the driving tool are so related as to form a plurality of spirally spaced rows projecting from the periphery of the roll.

The teeth of each row are staggered so that one tooth will engage the outer edge of a conductor near one side thereof and adjacent teeth will engage the outer edge of the same conductor near the other side thereof.

A disc 43 is located on each end of the assembled toothed discs 40.

The end and toothed discs are clamped in assembled position on the sleeve 41 between a flange 44 at one end and a collar 45 and nut 46 at the other end.

The driving tool 39 is mounted to rotate on a shaft 47 supported in the legs 48 of a U-shaped bracket 49.

The bracket 49 is mounted upon a carriage 50 arranged to travel along a track 51 in a direction transverse to the axis of the shaft 1.

By means of a hand wheel 52 and a feed screw 53 engaging the carriage 50, the driving tool supported on the carriage may be moved toward and from the rotor core mounted on shaft 1.

The axis of the driving tool is in substantially the same horizontal plane as the axis of shaft 1 which carries the rotor core.

The driving tool, by means of the feed screw 53 and hand wheel 52, is brought into such position that several teeth 42 of one row engage the outer edge of one of the conductors of the rotor winding.

As the rotor core with its winding applied thereto is rotated, the driving tool is also rotated and the rows of teeth are successively brought into engagement with the conductors and drive the same into the slots.

The driving tool, by means of a feed screw, is moved gradually closer to the rotor so that the conductors are driven to the bottom of the slots and are seated thereupon. When the conductors are finally seated upon the bottom of the slots, the teeth bite further into the outer edges of the conductors and expand the same so as to make the conductors impinge upon the side walls of the slots, thus fastening the conductors securely in the slots.

Of course, the invention disclosed herein is susceptible of various other modifications and adaptations.

The invention claimed is:

1. A machine for applying a sheet metal winding having integral conductors and end rings to a rotor, comprising mandrels separated from each other and adapted to receive between the same the rotor core, rollers arranged opposite said mandrels to hold the winding in position to be rolled into place, and rollers to force the longitudinal conductors into the slots.

2. A machine for applying a winding having longitudinal conductors to a slotted rotor, comprising a rotor support, and a roller having on its periphery rows of staggered projections to drive the conductors to their final position and to expand the same.

3. A machine for applying a winding having longitudinal conductors to a slotted rotor, comprising a rotor support, and a roller having on its periphery tapered projections to drive the conductors to their final position and to expand the same.

4. A machine for applying a sheet metal winding having integral conductors and end rings to a rotor, comprising a rotor support to carry and rotate the rotor, and means for shaping the end rings.

5. A machine for applying a sheet metal winding having integral conductors and end rings to a rotor, comprising a rotor support to carry and rotate the rotor, and a forming die for shaping the end rings.

6. A machine as defined in claim 5 which has guides to force the end rings into contact with the forming die.

7. A machine for applying to a peripherally slotted rotor core a winding having spaced conductors joined to end rings, comprising a rotatable shaft for the rotor core, a second rotatable shaft, and means carried by the second shaft to engage the conductors and the end rings so as to force the conductors into the slots and bend the end rings.

8. A machine for applying to a peripherally slotted rotor core a winding having spaced conductors joined to end rings, comprising a rotatable shaft for the rotor core, a second rotatable shaft, means carried by the second shaft to engage the conductors and the end rings so as to force the conductors into the slots and bend the end rings, and means for guiding the winding as it is being applied to the core.

9. A machine for applying to a peripherally slotted rotor core a winding having spaced conductors joined to end rings, comprising a rotatable shaft for the rotor core, a second rotatable shaft, and a pressure roller carried by the second shaft to engage the conductors and the end rings so as to force the conductors into the slots and bend the end rings.

10. A machine for applying to a peripherally slotted rotor core a winding having spaced conductors joined to end rings, comprising a rotatable shaft for the rotor core, a second rotatable shaft, and a pair of adjustable pressure rollers provided with flanges carried by the second shaft, the rollers to engage the edges of the conductors and the flanges to engage the end rings to force the conductors into the slots and bend the end rings.

11. A machine for applying to a peripherally slotted rotor core a winding having spaced conductors joined to end rings, comprising a rotatable shaft for the rotor core, a second rotatable shaft driven from the first shaft and adjustable with respect thereto, and means on the second shaft to engage the conductors and end rings so as to force the conductors into the slots and bend the end rings.

12. A machine for applying to a peripherally slotted rotor core, a winding having spaced conductors joined to end rings, comprising a rotatable shaft for the rotor core, a second rotatable shaft, and means carried by the second shaft to engage the conductors and the end rings so as to force the conductors into the slots.

13. A machine for applying to a peripherally slotted rotor core a winding having spaced conductors joined to end rings, comprising a rotatable shaft for the rotor core, a second rotatable shaft driven from the first shaft and adjustable with respect thereto, and means on the second shaft to engage the conductors and end rings so as to force the conductors into the slots.

14. A machine for applying to a peripherally slotted rotor core a winding having spaced conductors joined to end rings, comprising a rotatable shaft for the rotor core, a second rotatable shaft, means carried by the second shaft to engage the conductors and the end rings so as to force the conductors into the slots, and means for guiding the winding as it is being applied to the core.

15. A machine for applying to a peripheraly slotted rotor core a winding having spaced conductors joined to end rings, comprising a rotatable shaft for the rotor core, flanged mandrels on the shaft between which the rotor core is positioned, a second rotatable shaft, flanged pressure rollers on the second shaft to engage the conductors and end rings so as to force the conductors into the slots, and means cooperating with the flanged mandrels and pressure rollers to guide the winding as it is being applied.

16. A machine for applying to a peripherally slotted rotor core a winding having spaced conductors joined to end rings, comprising a rotatable shaft for the rotor core, flanged mandrels on the shaft between which the rotor core is positioned, a second rotatable shaft, flanged pressure rollers on the second shaft to engage the conductors and end rings so as to force the conductors into the slots, and means including a bar and adjustable guides to engage the conductors and end rings respectively so as to cooperate with the flanged mandrels to guide the winding as it is being applied.

17. A machine for applying to a peripherally slotted rotor core a winding having spaced conductors joined to end rings, comprising a rotatable shaft for the rotor core, flanged mandrels on the shaft between which the rotor core is positioned, a second rotatable shaft, flanged pressure rollers on the second shaft to engage the conductors and end rings so as to force the conductors into the slots, and means cooperating with the flanges of the mandrels to guide the winding as it is being applied.

18. A machine for applying to a peripherally slotted rotor core a winding having spaced conductors joined to end rings, comprising a rotatable support for the rotor core, and rotatable means adapted to engage the conductors and the end rings to force the conductors into the slots and bend the end rings.

19. A machine for applying to a peripherally slotted rotor core a winding having spaced conductors joined to end rings, comprising a rotatable support for the rotor core, means for preliminarily inserting the conductors into the slots and for bending said end rings, a shaft adjustable relatively to said rotatable support, and means carried by said shaft for inserting the conductors further into the slots.

20. A machine for applying a winding to a rotor, comprising a support for the rotor core to rotate said core, mandrels to rest adjacent the ends of the core, means to receive a winding sheet having conductors and ring forming bands and to drive said conductors partly into the core and to bend said ring forming bands, and a roller to drive the conductors substantially into the core.

21. A machine for applying a winding to a rotor core, comprising a support rotatably carrying the rotor core, means for preliminarily inserting the conductors of the winding into the rotor slots, and a series of teeth for engaging the conductors of the winding to drive the same further into the core.

22. A machine for applying a winding to a slotted rotor core, comprising a support for the rotor, means for preliminarily inserting the conductors into the rotor slots, and teeth to engage the conductors of the winding to drive said conductors further into the rotor slots and to spread the same against the sides of the said slots.

In witness whereof, I have hereunto subscribed my name.

JOHN M. BARR.